(12) United States Patent
Chun

(10) Patent No.: US 9,238,498 B2
(45) Date of Patent: Jan. 19, 2016

(54) SAFETY APPARATUS OF ELECTRIC BICYCLE AND SAFETY DRIVING METHOD THEREOF

(71) Applicant: Jae Hyung Chun, Yongin-si (KR)

(72) Inventor: Jae Hyung Chun, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/136,580

(22) Filed: Dec. 20, 2013

(65) Prior Publication Data

US 2015/0066267 A1  Mar. 5, 2015

(30) Foreign Application Priority Data

Aug. 27, 2013 (KR) .................. 10-2013-0101536

(51) Int. Cl.
| | |
|---|---|
| B62M 6/50 | (2010.01) |
| B60L 3/04 | (2006.01) |
| B62K 15/00 | (2006.01) |
| B62M 6/45 | (2010.01) |
| B62M 6/60 | (2010.01) |

(52) U.S. Cl.
CPC .. *B62M 6/50* (2013.01); *B60L 3/04* (2013.01); *B62K 15/006* (2013.01); *B62M 6/45* (2013.01); *B62M 6/60* (2013.01)

(58) Field of Classification Search
CPC ........... B62M 6/50; B62K 15/006; B06L 3/04
USPC ......................................................... 701/22
See application file for complete search history.

(56) References Cited

U.S. PATENT DOCUMENTS

| | | | | |
|---|---|---|---|---|
| 6,739,421 | B1 * | 5/2004 | Miya | .................... B62K 15/006 180/206.1 |
| 2003/0047363 | A1 * | 3/2003 | Makuta | .................... B60T 1/067 180/65.51 |
| 2003/0075372 | A1 | 4/2003 | Kurohori et al. | |

(Continued)

FOREIGN PATENT DOCUMENTS

| | | |
|---|---|---|
| CN | 201 901 226 | 7/2011 |
| DE | 10 2011 079595 | 1/2013 |

(Continued)

OTHER PUBLICATIONS

English translation of DE 102011079595 A1.*

(Continued)

*Primary Examiner* — Fadey Jabr
*Assistant Examiner* — Yazan A Soofi
(74) *Attorney, Agent, or Firm* — Ladas & Parry, LLP

(57) ABSTRACT

Disclosed herein are a safety apparatus of an electric bicycle and a safety driving method thereof. The safety apparatus of an electric bicycle includes a foldable portion which is foldable by rotation of a folding lever, a first sensing portion, a second sensing portion, a control unit provided with at least one of current rotation information and current folded position information and including at least one of sensing range information on a per rotation basis and sensing range information on a per position basis, and a safety drive portion which, when the control unit determines that at least one of the current rotation information and the current folded position information is deviated from at least one of the sensing range information on a per rotation basis and the sensing range information on a per position basis, turns off activation of a motor.

20 Claims, 20 Drawing Sheets

(56) References Cited

U.S. PATENT DOCUMENTS

| | | | |
|---|---|---|---|
| 2012/0043148 A1* | 2/2012 | Brady et al. | 180/206.5 |
| 2014/0081494 A1* | 3/2014 | Chun | B62M 6/45 701/22 |
| 2014/0081496 A1* | 3/2014 | Chun | B60L 11/00 701/22 |

FOREIGN PATENT DOCUMENTS

| | | | |
|---|---|---|---|
| DE | 102011079595 | * | 1/2013 |
| JP | 2004-322986 | | 11/2004 |
| KR | 10-2012-0109898 | | 10/2012 |

OTHER PUBLICATIONS

Extended European Search Report dated Jan. 7, 2015 for European Patent Application No. 13198210.0.

Notice of Allowance dated Jun. 15, 2015 for Korean Patent Application No. 10-2013-010536 and its English summary provided by Applicant's foreign counsel.

Office Action dated Dec. 26, 2014 for Korean Patent Application No. 10-2013-010536.

* cited by examiner

FIG. 17
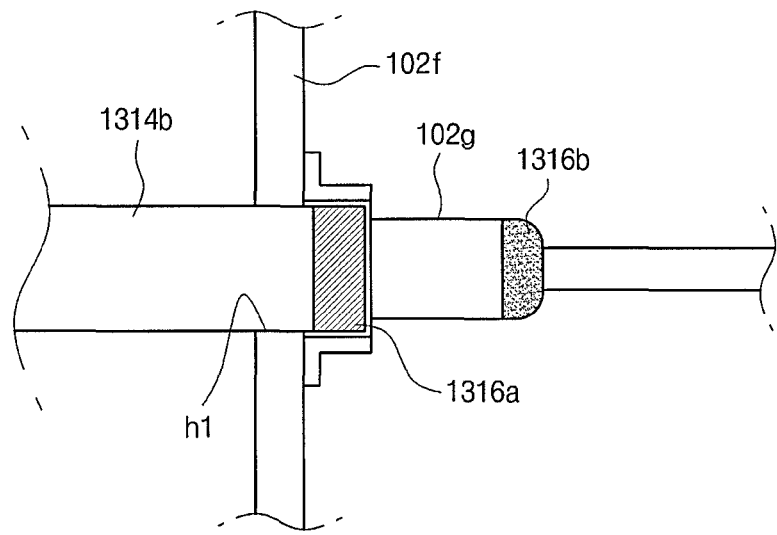
(A) STATE IN WHICH CURRENT ROTATION OF
FOLDING LEVER IS LIMITED
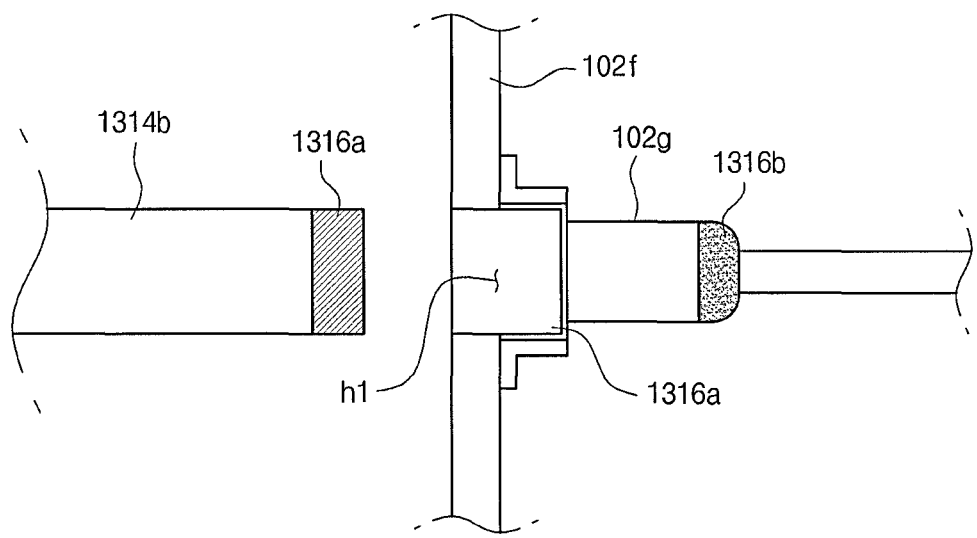
(B) STATE IN WHICH CURRENT ROTATION OF
FOLDING LEVER IS POSSIBLE

SAFETY APPARATUS OF ELECTRIC BICYCLE AND SAFETY DRIVING METHOD THEREOF

CROSS-REFERENCE TO RELATED APPLICATION

This application claims the benefit of Korean Patent Application No. 2013-0101536, filed on Aug. 27, 2013 in the Korean Intellectual Property Office, the disclosure of which is incorporated in its entirety herein by reference.

BACKGROUND

1. Field

Embodiments of the present invention relate to a safety apparatus of an electric bicycle and a safety driving method thereof.

2. Description of the Related Art

In general, a conventional electric bicycle is configured such that a battery voltage is supplied from a battery to a motor and the electric bicycle runs by driving of the motor.

In such a conventional electric bicycle, a rider determines a folded state of a foldable portion with the naked eye when folding the foldable portion.

In the conventional electric bicycle, when the folded state of the foldable portion is imperfect, imperfect running and safety accidents may occur according to activation of the motor.

Accordingly, in recent years, a study for a safety apparatus of an improved electric bicycle and a safety driving method thereof has been continuously conducted in order to suppress unnecessary consumption of a battery while preventing imperfect running and safety accidents by determining a folded state of a foldable portion or previously determining a state in which current rotation of a folding lever is possible to turn off activation of a motor according thereto.

In addition, in recent years, a study for a safety apparatus of an improved electric bicycle and a safety driving method thereof has been continuously conducted in order to further prevent safety accidents when a rider reactivates a motor to manipulate an electric bicycle.

SUMMARY

Therefore, it is an aspect of the present invention to provide a safety apparatus of an electric bicycle capable of suppressing unnecessary consumption of a battery while preventing imperfect running and safety accidents since activation of a motor may be turned off by determining a folded state of a foldable portion, and a safety driving method thereof.

It is another aspect of the present invention to provide a safety apparatus of an electric bicycle in which since it may be identified that activation of a motor is currently turned off when the activation of the motor is turned off, a rider recognizes that the activation of the motor is currently turned off, thereby enabling safety accidents to be further prevented during manipulation of an electric bicycle, and a safety driving method thereof.

It is another aspect of the present invention to provide a safety apparatus of an electric bicycle capable of suppressing unnecessary consumption of a battery while preventing imperfect running and safety accidents since activation of a motor may be turned off by previously determining a state in which current rotation of a folding lever is possible, and a safety driving method thereof.

It is a further aspect of the present invention to provide a safety apparatus of an electric bicycle capable of further preventing safety accidents during manipulation of an electric bicycle since a rider may reactivate a motor, and a safety driving method thereof.

Additional aspects of the invention will be set forth in part in the description which follows and, in part, will be obvious from the description, or may be learned by practice of the invention.

In accordance with one aspect of the present invention, a safety apparatus of an electric bicycle includes a foldable portion which is foldable by rotation of a folding lever, a first sensing portion to sense current rotation of the folding lever, a second sensing portion to sense a current folded position of the foldable portion, a control unit provided with at least one of current rotation information of the folding lever sensed by the first sensing portion and current folded position information of the foldable portion and including at least one of sensing range information on a per rotation basis of the folding lever and sensing range information on a per position basis of the foldable portion which are preset, and a safety drive portion which, when the control unit determines that at least one of the current rotation information of the folding lever and the current folded position information of the foldable portion is deviated from at least one of the sensing range information on a per rotation basis and the sensing range information on a per position basis, turns off activation of a motor depending upon control of the control unit.

The control unit may further include a first control signal for generation of a magnetic field, and the first sensing portion may include a first magnetic substance which receives the first control signal to generate a magnetic field and a folding lever rotation sensor which senses a current magnetic field formation region generated by the first magnetic substance according to the current rotation of the folding lever.

The control unit may further include a second control signal for generation of a magnetic field, and the second sensing portion may include a second magnetic substance which receives the second control signal to generate a magnetic field and a folded position sensor which senses a current magnetic field formation region generated by the second magnetic substance according to the current folded position of the foldable portion.

The safety apparatus may further include a second identification portion identifying that current activation of the motor is turned off when the safety drive portion turns off activation of the motor depending upon the control of the control unit.

The safety apparatus may further include a rotation limit portion to limit the current rotation of the folding lever and a third sensing portion which senses a limited state of the current rotation of the folding lever by the rotation limit portion, the control unit may be further provided with limited state information of the current rotation sensed by the third sensing portion and further include limited state sensing range information on a per rotation basis which is preset, and when the control unit determines that the limited state information of the current rotation is deviated from the limited state sensing range information on a per rotation basis, the safety drive portion may turn off the activation of the motor depending upon the control of the control unit.

The control unit may further include a third control signal for generation of a magnetic field, and the third sensing portion may include a third magnetic substance which receives the third control signal to generate a magnetic field and a rotation limit sensor which senses a current magnetic field formation region generated by the third magnetic substance according to the limited state of the current rotation.

The safety apparatus may further include a first identification portion identifying that current activation of the motor is turned off when the safety drive portion turns off activation of the motor depending upon the control of the control unit.

The safety apparatus may further include a second motor reactivation portion which is electrically connected to the motor and provides a reactivation signal to the motor depending upon the control of the control unit so as to reactivate the motor.

The safety apparatus may further include a first motor reactivation portion which is electrically connected to the motor and provides a reactivation signal to the motor depending upon the control of the control unit so as to reactivate the motor.

In accordance with another aspect of the present invention, a method of safely driving an electric bicycle includes performing a second sensing operation which executes at least one of operation to sense current rotation of a folding lever by a first sensing portion and operation to sense a current folded position of a foldable portion by a second sensing portion, performing a second determination operation which determines whether or not, in a control unit, at least one of current rotation information of the folding lever and current folded position information of the foldable portion is deviated from at least one of sensing range information on a per rotation basis of the folding lever and sensing range information on a per position basis of the foldable portion set in the control unit, and performing a second safety drive operation which, when the control unit determines that at least one of the current rotation information of the folding lever and the current folded position information of the foldable portion is deviated from at least one of the sensing range information on a per rotation basis and the sensing range information on a per position basis, allows a safety drive portion to turn off activation of a motor depending upon the control of the control unit.

The method may further include performing, after the second safety drive operation, a second identification operation which allows a second identification portion to identify that current activation of the motor is turned off when the safety drive portion turns off the activation of the motor depending upon the control of the control unit.

The method may further include performing, prior to the second sensing operation, a first sensing operation which allows a third sensing portion to sense a limited state of the current rotation of the folding lever by a rotation limit portion, performing, after the first sensing operation, a first determination operation which determines whether or not, in the control unit, limited state information of the current rotation is deviated from limited state sensing range information on a per rotation basis set in the control unit, and performing, after first determination operation, a first safety drive operation which, when the control unit determines that the limited state information of the current rotation is deviated from the limited state sensing range information on a per rotation basis, allows the safety drive portion to turn off the activation of the motor depending upon the control of the control unit.

The method may further include performing, after the first safety drive operation, a first identification operation which allows a first identification portion to identify that current activation of the motor is turned off when the safety drive portion turns off the activation of the motor depending upon the control of the control unit.

The method may further include performing, after the second safety drive operation, a second motor reactivation operation which allows a second motor reactivation portion to be electrically connected to the motor and to provide a reactivation signal to the motor depending upon the control of the control unit so as to reactivate the motor.

The method may further include performing, after the first safety drive operation, a first motor reactivation operation which allows a first motor reactivation portion to be electrically connected to the motor and to provide a reactivation signal to the motor depending upon the control of the control unit so as to reactivate the motor.

BRIEF DESCRIPTION OF THE DRAWINGS

These and/or other aspects of the invention will become apparent and more readily appreciated from the following description of the embodiments, taken in conjunction with the accompanying drawings of which:

FIG. 17 is a cross-sectional view illustrating a state in which current rotation of the folding lever is possible by pulling the pull member in a state in which the current rotation of the folding lever is limited by the plate member of FIG. 16;

DETAILED DESCRIPTION

Figure 1:
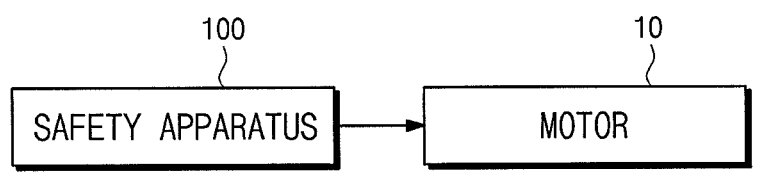
FIG. 1 is a block diagram illustrating a state in which a safety apparatus of an electric bicycle according to a first embodiment of the present invention is connected to a motor.

Reference will now be made in detail to the embodiments of the present invention, examples of which are illustrated in the accompanying drawings, wherein like reference numerals refer to like elements throughout.

First Embodiment

Figure 2:
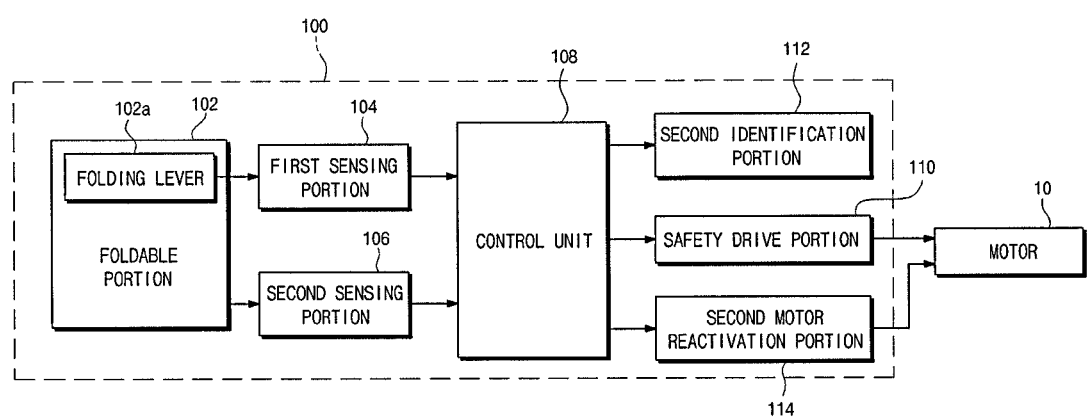
FIG. 2 is a block diagram illustrating an example of the safety apparatus of an electric bicycle shown in FIG. 1.

FIG. 1 is a block diagram illustrating a state in which a safety apparatus of an electric bicycle according to a first embodiment of the present invention is connected to a motor. FIG. 2 is a block diagram illustrating an example of the safety apparatus of an electric bicycle shown in FIG. 1.

Figure 3:
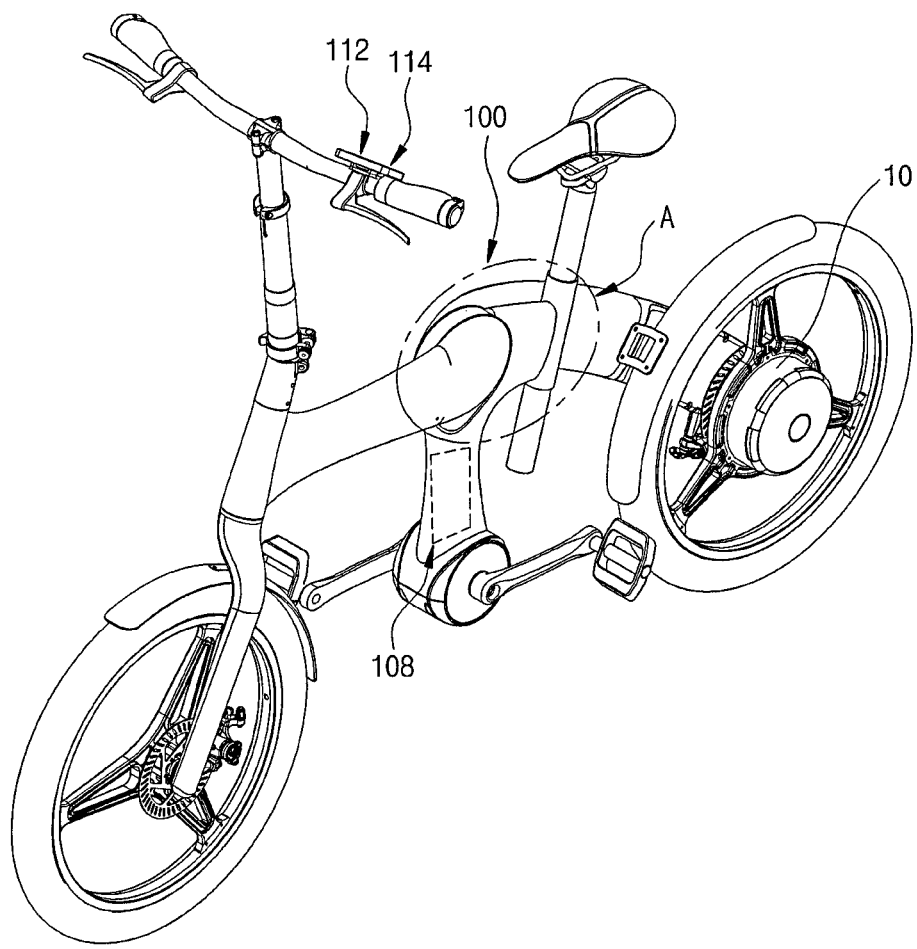
FIG. 3 is a perspective view illustrating the example of the safety apparatus of an electric bicycle according to the first embodiment of the present invention.
Figure 4:
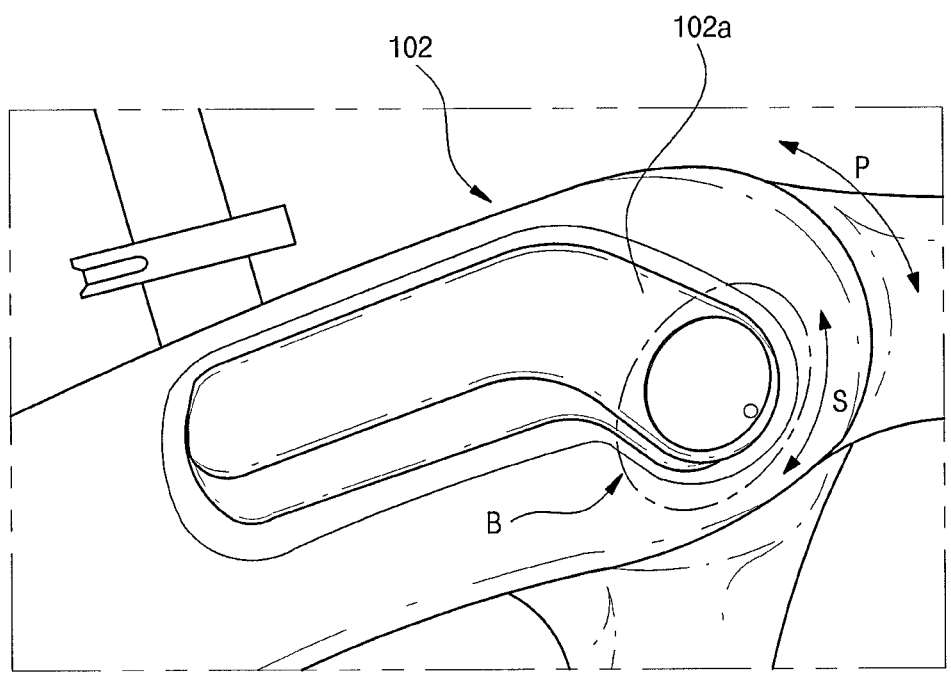
FIG. 4 is an enlarged front view partially illustrating portion "A" in FIG. 3.

FIG. 3 is a perspective view illustrating the example of the safety apparatus of an electric bicycle according to the first embodiment of the present invention. FIG. 4 is an enlarged front view partially illustrating portion "A" in FIG. 3.

Figure 5:
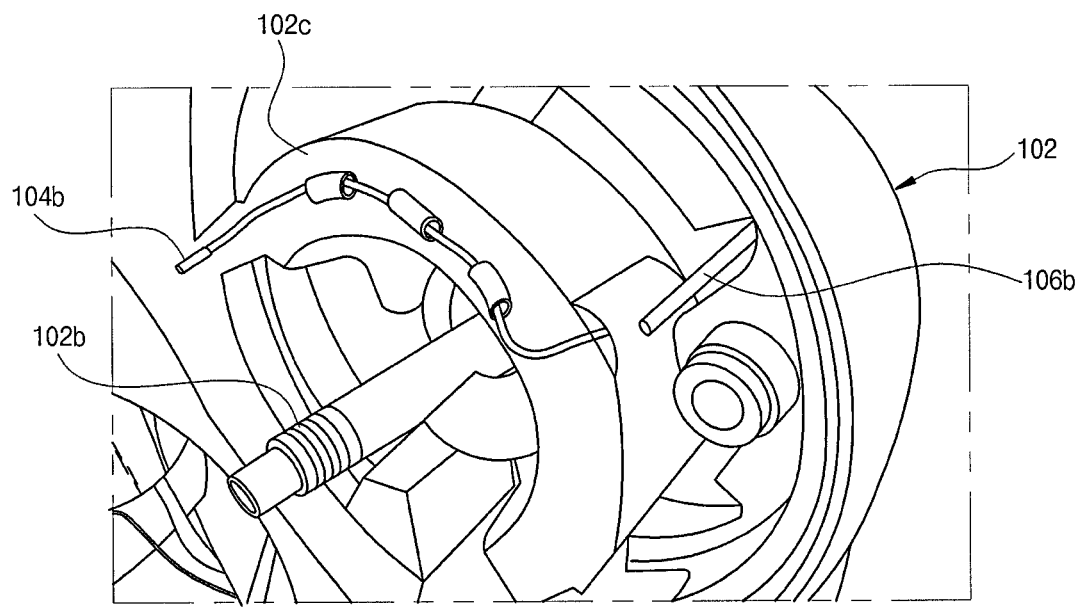
FIG. 5 is an enlarged perspective view partially illustrating portion "B" without a folding lever in FIG. 4, the drawing showing a folding lever rotation sensor and a folding position sensor provided within a foldable portion.

FIG. 5 is an enlarged perspective view partially illustrating portion "B" without a folding lever in FIG. 4, the drawing showing a folding lever rotation sensor and a folding position sensor provided within a foldable portion.

Figure 6:
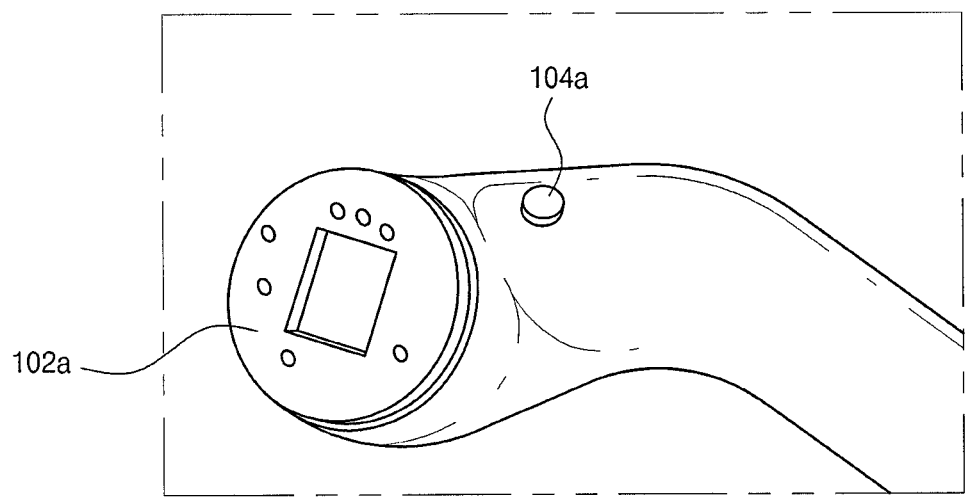
FIG. 6 is a rear view partially illustrating a folding lever including a first magnetic substance provided at a position corresponding to the folding lever rotation sensor in FIG. 5.
Figure 7:
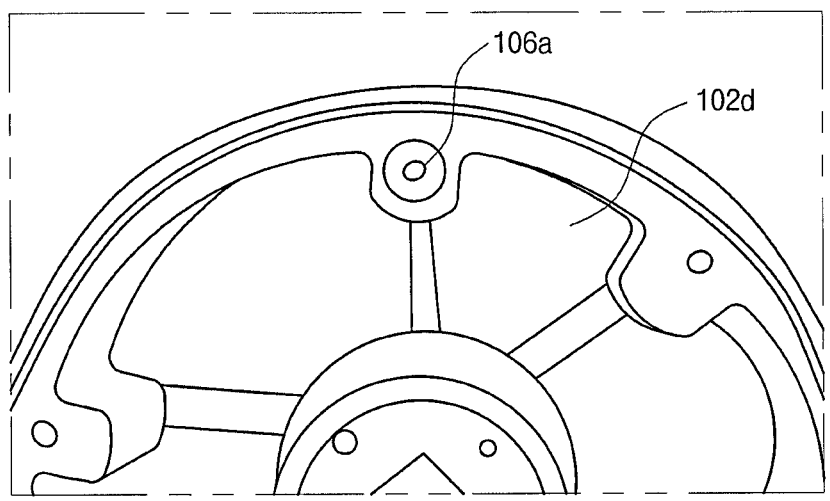
FIG. 7 is a rear view partially illustrating a foldable portion frame including a second magnetic substance provided at a position corresponding to the folding position sensor.

FIG. 6 is a rear view partially illustrating a folding lever including a first magnetic substance provided at a position corresponding to the folding lever rotation sensor in FIG. 5. FIG. 7 is a rear view partially illustrating a foldable portion frame including a second magnetic substance provided at a position corresponding to the folding position sensor.

Referring to FIGS. 1 to 7, a safety apparatus of an electric bicycle 100 according to a first embodiment of the present invention includes a foldable portion 102, a first sensing portion 104, a second sensing portion 106, a control unit 108, and a safety drive portion 110.

The foldable portion 102 is foldable by rotation S of a folding lever 102a.

As an example, as shown in FIGS. 4 and 5, the foldable portion 102 is foldable when a rider grips the folding lever 102a axially coupled to a rotary shaft 102b and pulls the folding lever 102a in an upward direction which is a clockwise direction of rotation S of the folding lever 102a.

The first sensing portion 104 senses current rotation S of the folding lever 102a, and the second sensing portion 106 senses a current folded position P of the foldable portion 102.

The control unit 108 is provided with at least one of current rotation information of the folding lever 102a sensed by the first sensing portion 104 and current folded position information of the foldable portion 102, and includes at least one of sensing range information on a per rotation basis of the folding lever 102a and sensing range information on a per position basis of the foldable portion 102 which are preset.

When the control unit 108 determines that at least one of the current rotation information of the folding lever 102a and the current folded position information of the foldable portion 102 is deviated from at least one of the sensing range information on a per rotation basis and the sensing range information on a per position basis, the safety drive portion 110 turns off activation of a motor 10 depending upon the control of the control unit 108.

In this case, although not shown, the control unit 108 and the safety drive portion 110 may control overall operation of the electric bicycle using a main computer applied to the electric bicycle, control overall operation of the electric bicycle by a typical ECU (Electric Control Unit) (not shown) or a processor, a memory, and an input/output device provided within a single chip for driving thereof, and include an MCU (Micro Control Unit) (not shown) for driving thereof, but the present invention is not limited thereto. For example, all control means and driving means are applicable as long as the overall operation of the electric bicycle may be controlled and the electric bicycle may be driven.

Here, the control unit 108 and the safety drive portion 110 may be provided as an ECU (not shown) or an MCU (not shown) in an integral type, or may be provided as an ECU (not shown) or an MCU (not shown) in a separate type.

As an example, the first sensing portion 104 may include a first magnetic substance 104a and a folding lever rotation sensor 104b, and the control unit 108 may further include a first control signal for generation of a magnetic field.

In this case, the first magnetic substance 104a may be provided at one side of the folding lever 102a and generate a permanently magnetic field. The folding lever rotation sensor 104b may be provided at one side of a support member 102c arranged inside the foldable portion 102 and correspond to the first magnetic substance 104a to sense a current magnetic field formation region generated by the first magnetic substance 104a according to the current rotation information of the folding lever 102a.

Here, the first magnetic substance 104a may be provided at one side of the folding lever 102a and receive the first control signal from the control unit 108 to generate a magnetic field. The folding lever rotation sensor 104b may be provided at one side of a support member 102c arranged inside the foldable portion 102 and correspond to the first magnetic substance 104a to sense a current magnetic field formation region generated by the first magnetic substance 104a according to the current rotation information of the folding lever 102a.

Here, the folding lever rotation sensor 104b may be electrically connected to the control unit 108 using a wire cable or perform wireless communication with the control unit 108.

In this case, when the control unit 108 determines that the current magnetic field formation region generated by the first magnetic substance 104a according to the current rotation information of the folding lever 102a is deviated from a sensing range of a reference magnetic field formation region generated by the first magnetic substance 104a according to the sensing range information on a per rotation basis of the folding lever 102a, the safety drive portion 110 may turn off activation of the motor 10 depending upon the control of the control unit 108.

That is, when the control unit 108 determines that the first magnetic substance 104a and the folding lever rotation sensor 104b are not present at positions corresponding to each other according to the current rotation of the folding lever 102a, the foldable portion is determined as a folded state and the safety drive portion 110 may turn off activation of the motor 10 depending upon the control of the control unit 108.

As another example, the second sensing portion 106 may include a second magnetic substance 106a and a folding position sensor 106b, and the control unit 108 may further include a second control signal for generation of a magnetic field.

Here, the second sensing portion 106 may be provided at one side of a first frame 102d which is fastened to one side of the foldable portion 102 to protect the inner portion of the foldable portion 102, and receive the second control signal from the control unit 108 to generate a magnetic field. The folding position sensor 106b may be provided at the other side of the support member 102c arranged inside the foldable portion 102 and correspond to the second magnetic substance 106a to sense a current magnetic field formation region generated by the second magnetic substance 106a according to the current folded position of the foldable portion 102.

Here, the folding position sensor 106b may be electrically connected to the control unit 108 using a wire cable or perform wireless communication with the control unit 108.

In this case, when the control unit 108 determines that the current magnetic field formation region generated by the second magnetic substance 106a according to the current folded position information of the foldable portion 102 is deviated from a sensing range of a reference magnetic field formation region generated by the second magnetic substance 106a according to the sensing range information on a per position basis of the foldable portion 102, the safety drive portion 110 may turn off activation of the motor 10 depending upon the control of the control unit 108.

That is, when the control unit 108 determines that the second magnetic substance 106a and the folding position sensor 106b are not present at positions corresponding to each other according to the current folded position of the foldable portion 102, the foldable portion is determined as a folded state and the safety drive portion 110 may turn off activation of the motor 10 depending upon the control of the control unit 108.

In addition, the safety apparatus of an electric bicycle 100 according to the first embodiment of the present invention further include a second identification portion 112.

That is, the second identification portion 112 identifies that current activation of the motor 10 is turned off when the safety drive portion 110 turns off activation of the motor depending upon the control of the control unit 108.

In this case, although not shown, the second identification portion 112 includes at least one of an alarm (not shown), a speaker (not shown), and a light emitting member (not shown) which are provided at one side of the electric bicycle such that a rider identifies the information or state of the electric bicycle, and includes at least one of an HMI (Human Machine Interface) module (not shown) and an HUD (Head-UP Display) module (not shown) which are mounted such that a rider grasps the information or state of the electric bicycle by interfacing with machines. Accordingly, the second identification portion 112 may identify that the current activation of the motor 10 is turned off through at least one of alarm operation of the alarm (not shown), voice operation of the speaker (not shown), light emitting operation of the light emitting member (not shown), HMI message display operation of the HMI module (not shown), and HUD message display operation of the HUD (not shown).

In addition, the safety apparatus of an electric bicycle 100 according to the first embodiment of the present invention further include a second motor reactivation portion 114.

That is, the second motor reactivation portion 114 is electrically connected to the motor 10 and provides a reactivation signal to the motor 10 depending upon the control of the control unit 108 so as to reactivate the motor 10.

In this case, although not shown, the second motor reactivation portion 114 may reactivate the motor 10 by button operation of a motor reactivation button (not shown).

Hereinafter, a description will be given of a safety driving method of an electric bicycle to safely drive the electric bicycle using the safety apparatus of an electric bicycle according to the first embodiment of the present invention with reference to FIGS. 8 to 12.

Figure 8:
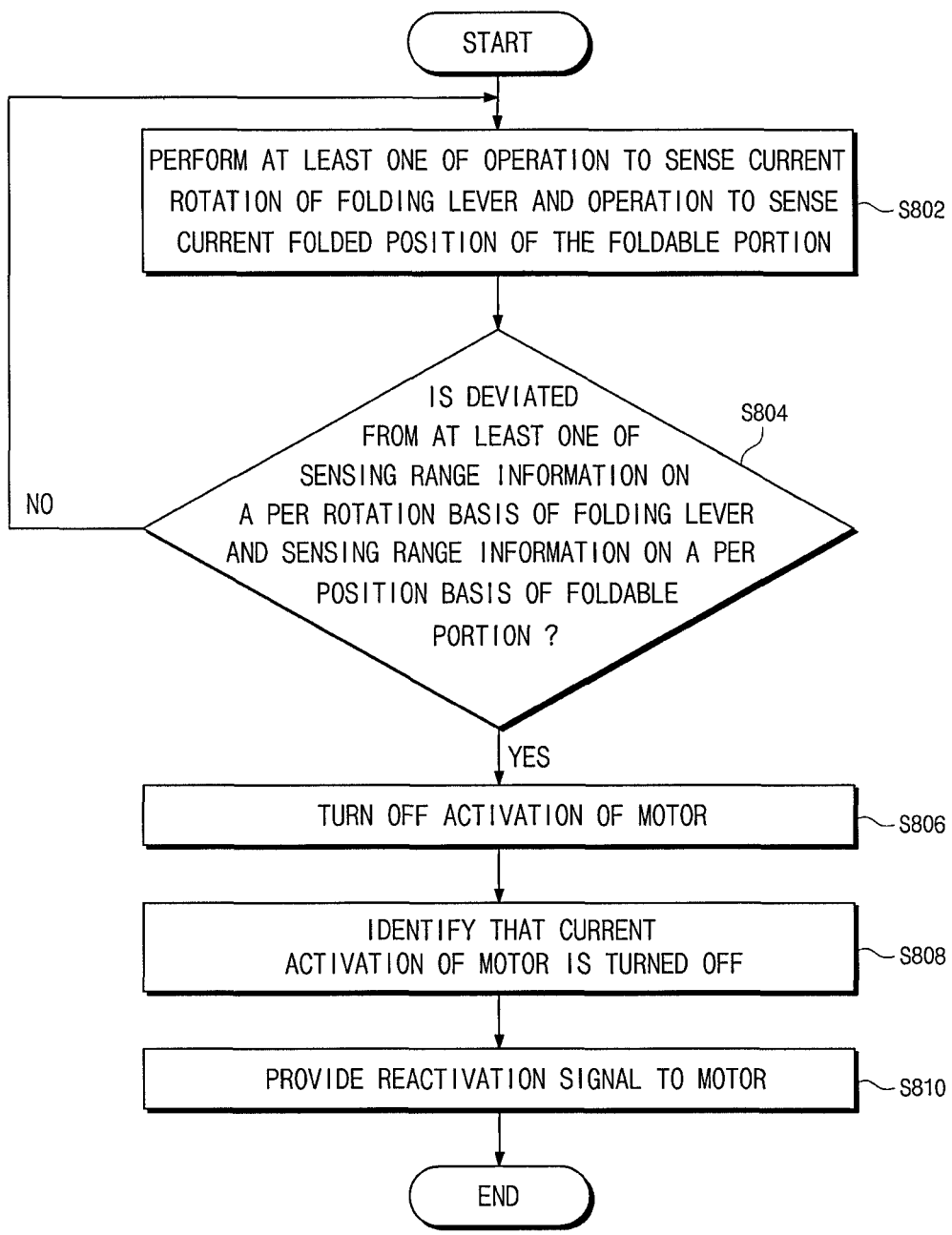
FIG. 8 is a flowchart illustrating a safety driving method of an electric bicycle using the safety apparatus of an electric bicycle according to the first embodiment of the present invention.

FIG. 8 is a flowchart illustrating a safety driving method of an electric bicycle using the safety apparatus of an electric bicycle according to the first embodiment of the present invention.

Figure 9:
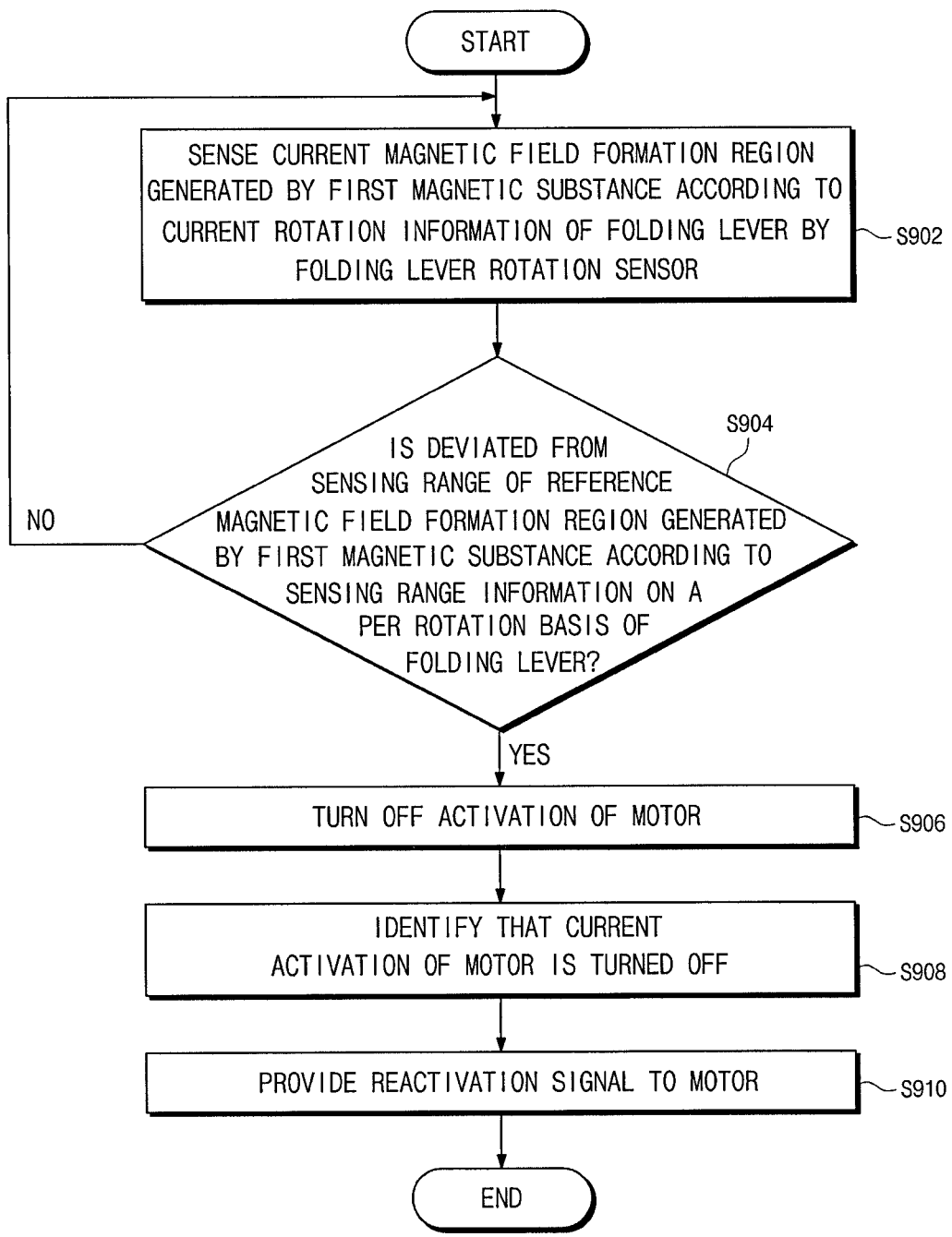
FIG. 9 is a flowchart illustrating an example of the safety driving method of an electric bicycle using the safety apparatus of an electric bicycle according to the first embodiment of the present invention.
Figure 10:
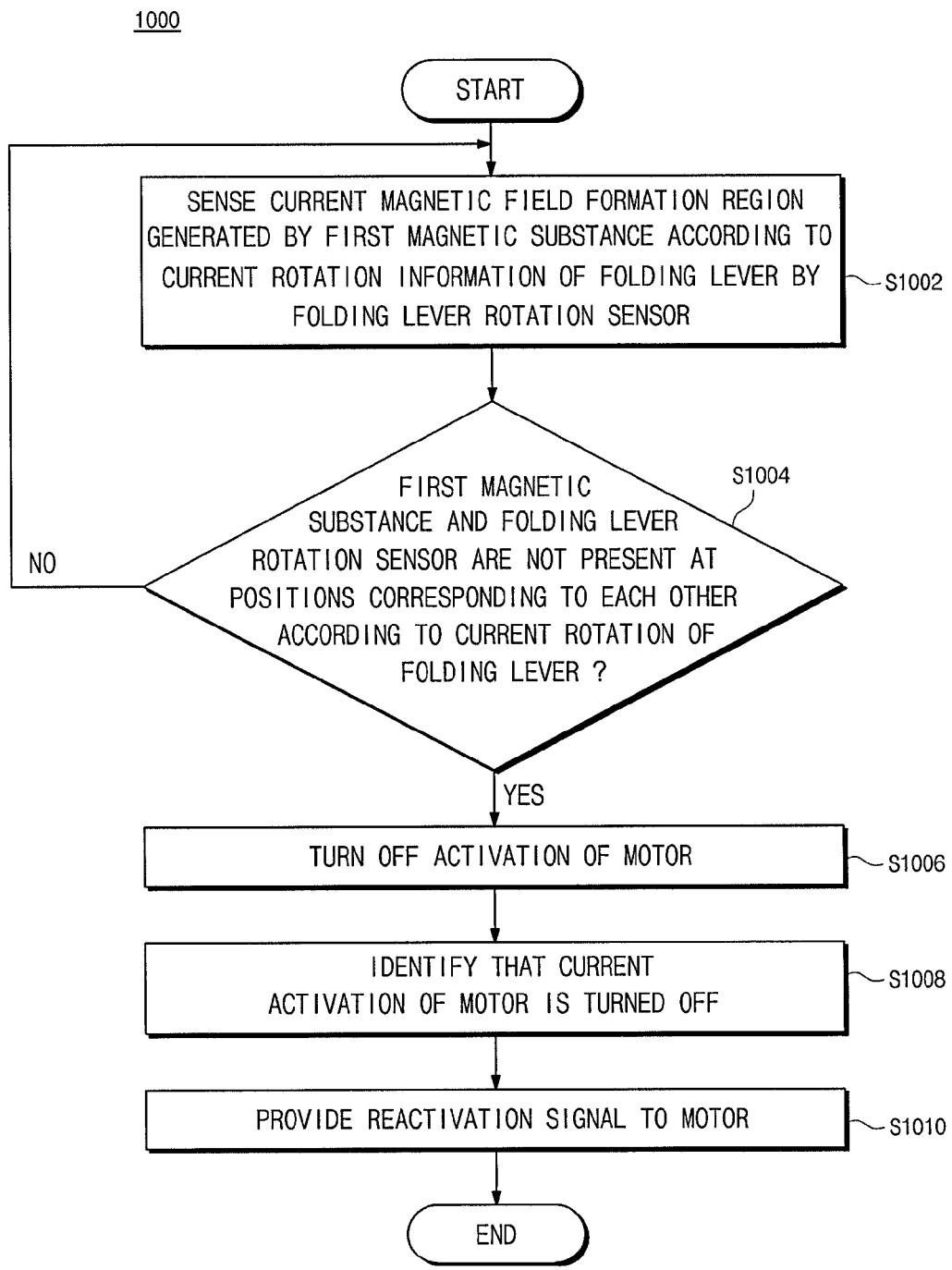
FIG. 10 is a flowchart illustrating another example of the safety driving method of an electric bicycle using the safety apparatus of an electric bicycle according to the first embodiment of the present invention.

FIG. 9 is a flowchart illustrating an example of the safety driving method of an electric bicycle using the safety apparatus of an electric bicycle according to the first embodiment of the present invention. FIG. 10 is a flowchart illustrating another example of the safety driving method of an electric bicycle using the safety apparatus of an electric bicycle according to the first embodiment of the present invention.

Figure 11:
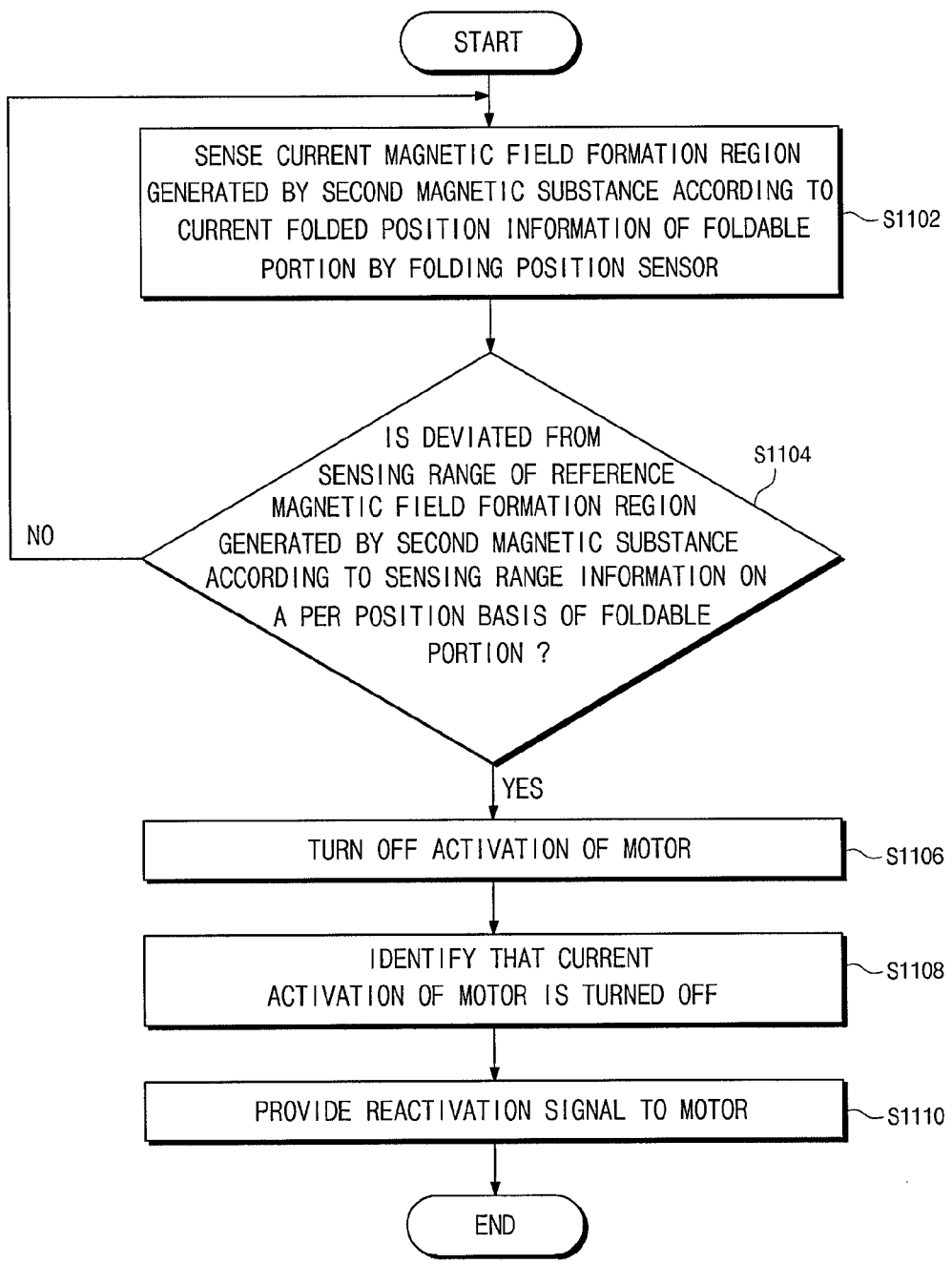
FIG. 11 is a flowchart illustrating a still example of the safety driving method of an electric bicycle using the safety apparatus of an electric bicycle according to the first embodiment of the present invention.
Figure 12:
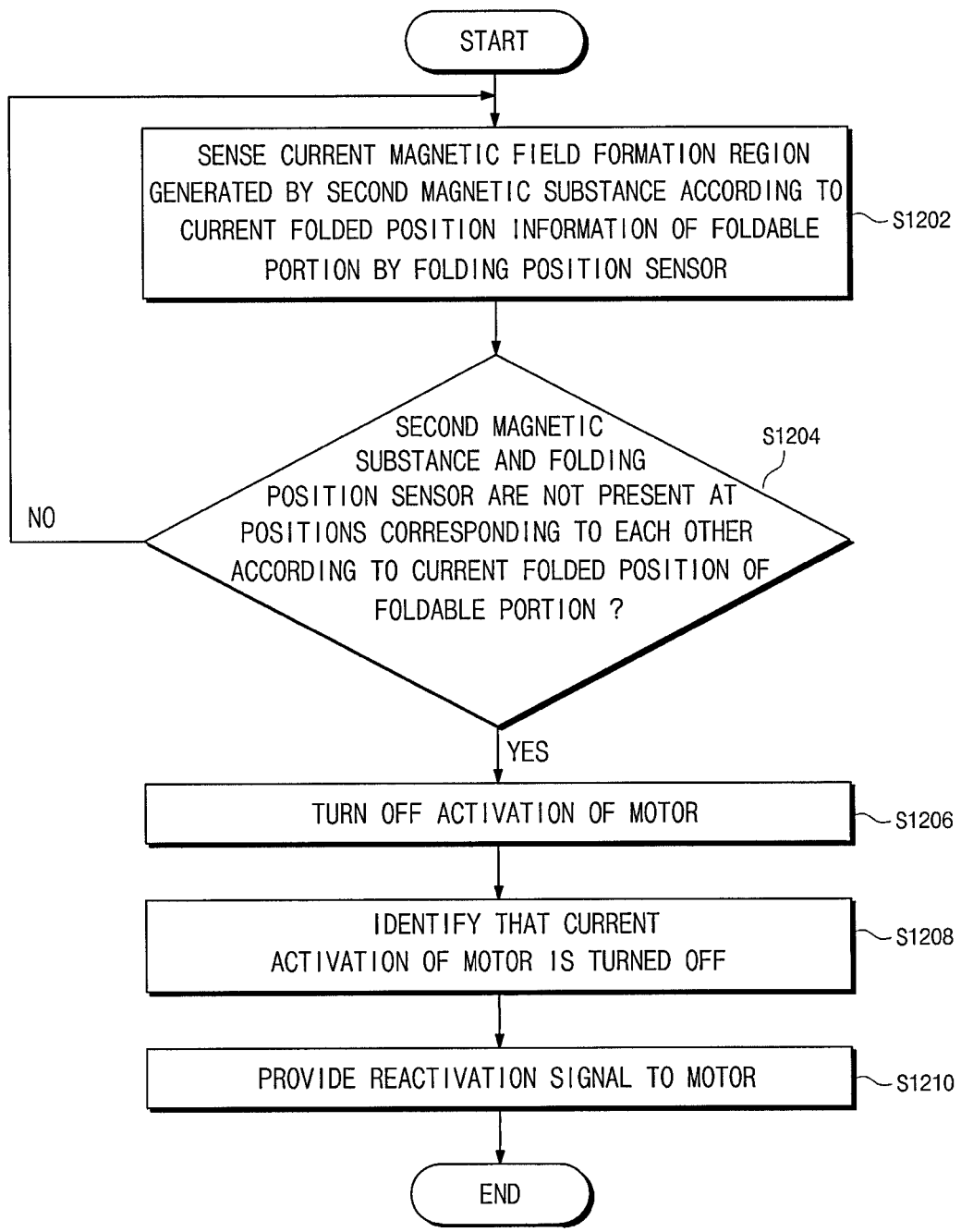
FIG. 12 is a flowchart illustrating a further example of the safety driving method of an electric bicycle using the safety apparatus of an electric bicycle according to the first embodiment of the present invention.

FIG. 11 is a flowchart illustrating a still example of the safety driving method of an electric bicycle using the safety apparatus of an electric bicycle according to the first embodiment of the present invention. FIG. 12 is a flowchart illustrating a further example of the safety driving method of an electric bicycle using the safety apparatus of an electric bicycle according to the first embodiment of the present invention.

Referring to FIGS. 8 to 12, a safety driving method of an electric bicycle 800, 900, 1000, 1100, 1200 using the safety apparatus of an electric bicycle 100 (see FIGS. 1 and 2) according to the first embodiment of the present invention includes a second sensing operation S802, S902, S1002, S1102, S1202, a second determination operation S804, S904, S1004, S1104, S1204, and a second safety drive operation S806, S906, S1006, S1106, S1206.

First, the second sensing operation S802 performs at least one of operation to sense the current rotation S (see FIG. 4) of the folding lever 102a (see FIGS. 2, 4, and 6) by the first sensing portion 104 (see FIG. 2) and operation to sense the current folded position P (see FIG. 4) of the foldable portion 102 (see FIGS. 2, 4, and 5) by the second sensing portion 106 (see FIG. 2).

Subsequently, the second determination operation S804 determines whether or not, in the control unit 108 (see FIGS. 2 and 3), at least one of the current rotation information of the folding lever 102a (see FIGS. 2, 4, and 6) and the current folded position information of the foldable portion 102 (see FIGS. 2, 4, and 5) is deviated from at least one of the sensing range information on a per rotation basis of the folding lever 102a (see FIGS. 2, 4, and 6) and the sensing range information on a per position basis of the foldable portion 102 (see FIGS. 2, 4, and 5) which are set in the control unit 108 (see FIGS. 2 and 3).

Finally, when the control unit 108 (see FIGS. 2 and 3) determines that at least one of the current rotation information of the folding lever 102a (see FIGS. 2, 4, and 6) and the current folded position information of the foldable portion 102 (see FIGS. 2, 4, and 5) is deviated from at least one of the sensing range information on a per rotation basis and the sensing range information on a per position basis, the second safety drive operation S806 allows the safety drive portion 110 (see FIG. 2) to turn off activation of the motor 10 (see FIGS. 1 to 3) depending upon the control of the control unit 108 (see FIGS. 2 and 3).

As an example, as shown in FIGS. 9 and 10, the second sensing operation S902, S1002 may sense the current magnetic field formation region generated by the first magnetic substance 104a (see FIG. 6) according to the current rotation information of the folding lever 102a (see FIGS. 2, 4, and 6) by the folding lever rotation sensor 104b (see FIG. 5).

Subsequently, the second determination operation S904 may determine whether or not, in the control unit 108 (see FIGS. 2 and 3), the current magnetic field formation region generated by the first magnetic substance 104a (see FIG. 6) according to the current rotation information of the folding lever 102a (see FIGS. 2, 4, and 6) is deviated from the sensing range of the reference magnetic field formation region generated by the first magnetic substance 104a (see FIG. 6) according to the sensing range information on a per rotation basis of the folding lever 102a (see FIGS. 2, 4, and 6) which is set in the control unit 108 (see FIGS. 2 and 3).

Finally, when the control unit 108 (see FIGS. 2 and 3) determines that the current magnetic field formation region generated by the first magnetic substance 104a (see FIG. 6) according to the current rotation information of the folding lever 102a (see FIGS. 2, 4, and 6) is deviated from the sensing range of the reference magnetic field formation region generated by the first magnetic substance 104a (see FIG. 6) according to the sensing range information on a per rotation basis of the folding lever 102a (see FIGS. 2, 4, and 6), the second safety drive operation S906 allows the safety drive portion 110 (see FIG. 2) to turn off activation of the motor 10 (see FIGS. 1 to 3) depending upon the control of the control unit 108 (see FIGS. 2 and 3).

That is, as shown in FIG. 10, when the control unit 108 (see FIGS. 2 and 3) determines that the first magnetic substance 104a (see FIG. 6) and the folding lever rotation sensor 104b (see FIG. 5) are not present at positions corresponding to each other according to the current rotation of the folding lever 102a (see FIGS. 2, 4, and 6) (operation S1004), the foldable portion is determined as a folded state and the second safety drive operation S1006 allows the safety drive portion 110 (see FIG. 2) to turn off activation of the motor 10 (see FIGS. 1 to 3) depending upon the control of the control unit 108 (see FIGS. 2 and 3).

As another example, as shown in FIGS. 11 and 12, the second sensing operation S1102, S1202 may sense the current magnetic field formation region generated by the second magnetic substance 106a (see FIG. 7) according to the current folded position information of the foldable portion 102 (see FIGS. 2, 4, and 5) by the folding position sensor 106b (see FIG. 5).

Subsequently, the second determination operation S1104 may determine whether or not, in the control unit 108 (see FIGS. 2 and 3), the current magnetic field formation region generated by the second magnetic substance 106a (see FIG. 7) according to the current folded position information of the foldable portion 102 (see FIGS. 2, 4, and 5) is deviated from the sensing range of the reference magnetic field formation region generated by the second magnetic substance 106a (see FIG. 7) according to the sensing range information on a per position basis of the foldable portion 102 (see FIGS. 2, 4, and 5).

Finally, when the control unit 108 (see FIGS. 2 and 3) determines that the current magnetic field formation region generated by the second magnetic substance 106a (see FIG. 7) according to the current folded position information of the foldable portion 102 (see FIGS. 2, 4, and 5) is deviated from the sensing range of the reference magnetic field formation region generated by the second magnetic substance 106a (see FIG. 7) according to the sensing range information on a per position basis of the foldable portion 102 (see FIGS. 2, 4, and 5), the second safety drive operation S1106 allows the safety drive portion 110 (see FIG. 2) to turn off activation of the motor 10 (see FIGS. 1 to 3) depending upon the control of the control unit 108 (see FIGS. 2 and 3).

That is, as shown in FIG. 12, when the control unit 108 (see FIGS. 2 and 3) determines that the second magnetic substance 106a (see FIG. 7) and the folding position sensor 106b (see FIG. 5) are not present at positions corresponding to each other according to the current folded position of the foldable portion 102 (see FIGS. 2, 4, and 5) (operation S1204), the foldable portion is determined as a folded state and the second safety drive operation S1206 allows the safety drive portion 110 (see FIG. 2) to turn off activation of the motor 10 (see FIGS. 1 to 3) depending upon the control of the control unit 108 (see FIGS. 2 and 3).

Meanwhile, the safety driving method of an electric bicycle 800, 900, 1000, 1100, 1200 using the safety apparatus of an electric bicycle 100 (see FIGS. 1 to 3) according to the first embodiment of the present invention may further perform a second identification operation S808, S908, S1008, S1108, S1208 after the second safety drive operation S806, S906, S1006, S1106, S1206.

That is, the second identification operation S808, S908, S1008, S1108, S1208 may allow the second identification portion 112 (see FIGS. 2 and 3) to identify that current activation of the motor 10 (see FIGS. 1 to 3) is turned off when the safety drive portion 110 (see FIG. 2) turns off activation of the motor 10 (see FIGS. 1 to 3) depending upon the control of the control unit 108 (see FIGS. 2 and 3).

In addition, the safety driving method of an electric bicycle 800, 900, 1000, 1100, 1200 using the safety apparatus of an electric bicycle 100 (see FIGS. 1 to 3) according to the first embodiment of the present invention may further perform a second motor reactivation operation S810, S910, S1010, S1110, S1210 after the second safety drive operation S806, S906, S1006, S1106, S1206.

That is, the second motor reactivation operation S810, S910, S1010, S1110, S1210 may allow the second motor reactivation portion 114 (see FIGS. 2 and 3) to be electrically connected to the motor 10 (see FIGS. 1 to 3) and to provide a reactivation signal to the motor 10 (see FIGS. 1 to 3) depending upon the control of the control unit 108 (see FIGS. 2 and 3) so as to reactivate the motor 10 (see FIGS. 1 to 3).

As described above, the safety apparatus of an electric bicycle 100 according to the first embodiment of the present invention includes the foldable portion 102, the first sensing portion 104, the second sensing portion 106, the control unit 108, and the safety drive portion 110, and the safety driving method 800, 900, 1000, 1100, 1200 thereof performs the second sensing operation S802, S902, S1002, S1102, S1202, the second determination operation S804, S904, S1004, S1104, S1204, the second safety drive operation S806, S906, S1006, S1106, S1206, second identification operation S808, S908, S1008, S1108, S1208, and the second motor reactivation operation S810, S910, S1010, S1110, S1210.

Accordingly, in accordance with the safety apparatus of an electric bicycle 100 and the safety driving method 800, 900, 1000, 1100, 1200 thereof according to the first embodiment of the present invention, since the activation of the motor 10 may be turned off by determining a folded state of foldable portion 102, it may be possible to suppress unnecessary consumption of a battery while preventing imperfect running and safety accidents.

In addition, in accordance with the safety apparatus of an electric bicycle 100 and the safety driving method 800, 900, 1000, 1100, 1200 thereof according to the first embodiment of the present invention, since it may be identified that activation of the motor 10 is currently turned off when the activation of the motor 10 is turned off, a rider recognizes that the activation of the motor 10 is currently turned off, thereby enabling safety accidents to be further prevented during manipulation of the electric bicycle.

In addition, in accordance with the safety apparatus of an electric bicycle 100 and the safety driving method 800, 900, 1000, 1100, 1200 thereof according to the first embodiment of the present invention, since a rider may reactivate the motor 10, it may be possible to further prevent safety accidents during manipulation of the electric bicycle.

Second Embodiment

Figure 13:
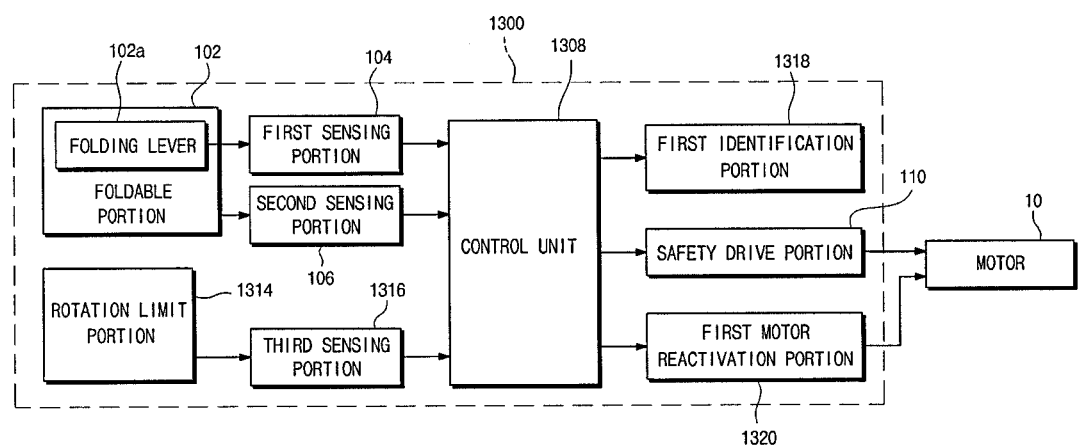
FIG. 13 is a block diagram illustrating an example of a safety apparatus of an electric bicycle according to a second embodiment of the present invention.
Figure 14:
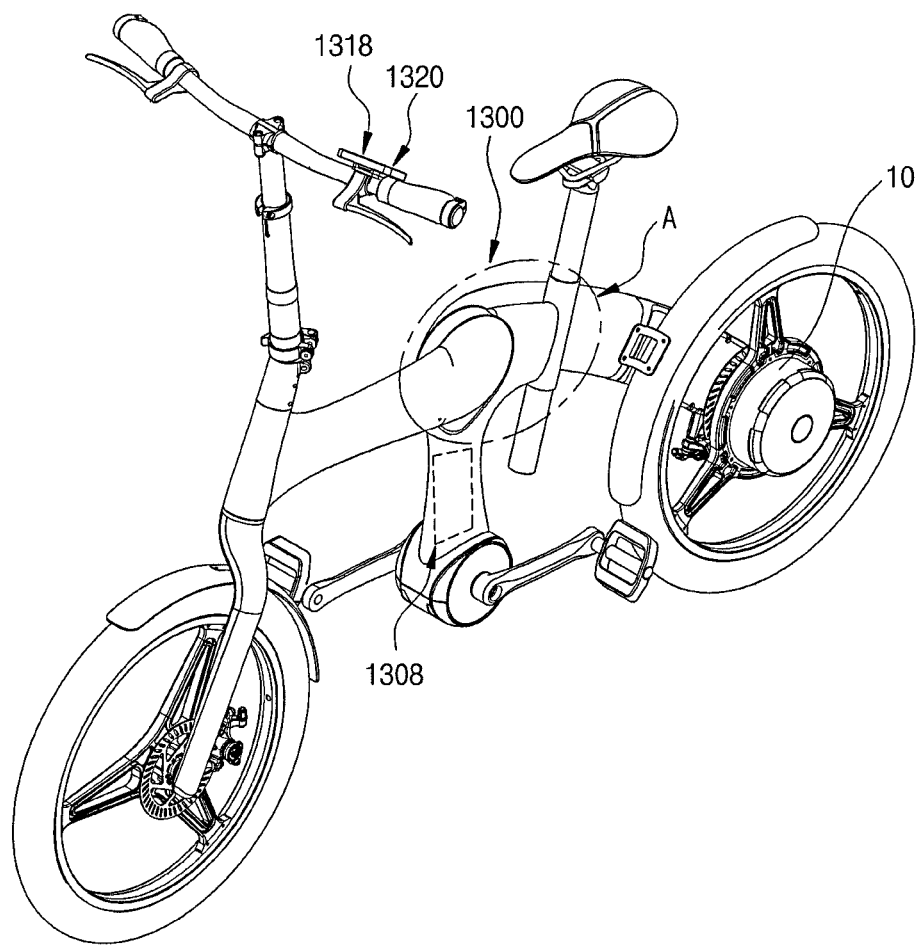
FIG. 14 is a perspective view illustrating the example of the safety apparatus of an electric bicycle according to the second embodiment of the present invention.

FIG. 13 is a block diagram illustrating an example of a safety apparatus of an electric bicycle according to a second embodiment of the present invention. FIG. 14 is a perspective view illustrating the example of the safety apparatus of an electric bicycle according to the second embodiment of the present invention.

Figure 15:
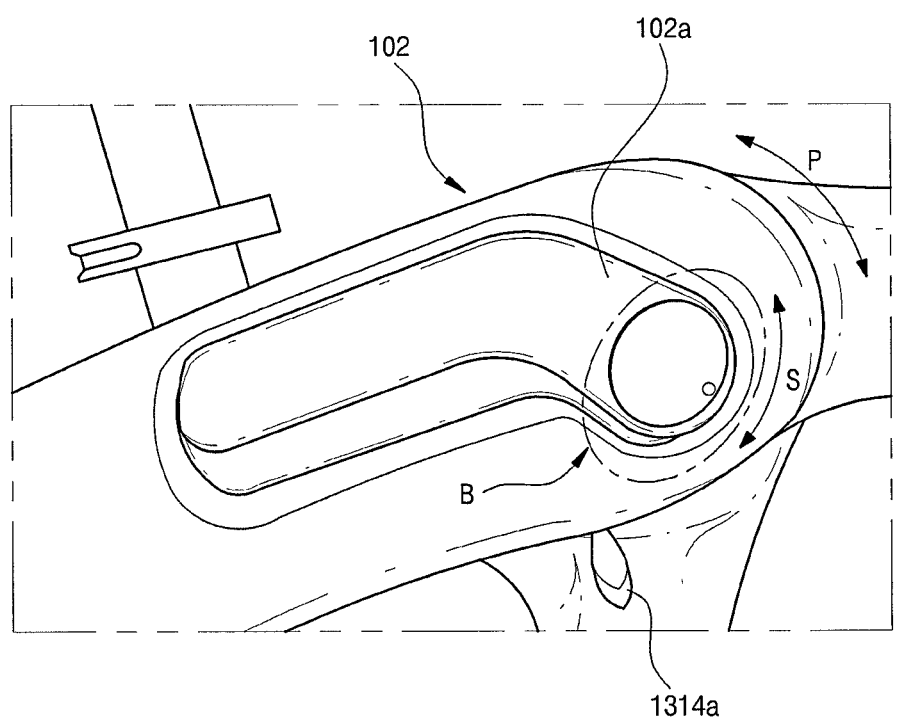
FIG. 15 is an enlarged front view partially illustrating portion "A" in FIG. 14.

FIG. 15 is an enlarged front view partially illustrating portion "A" in FIG. 14.

Figure 16:
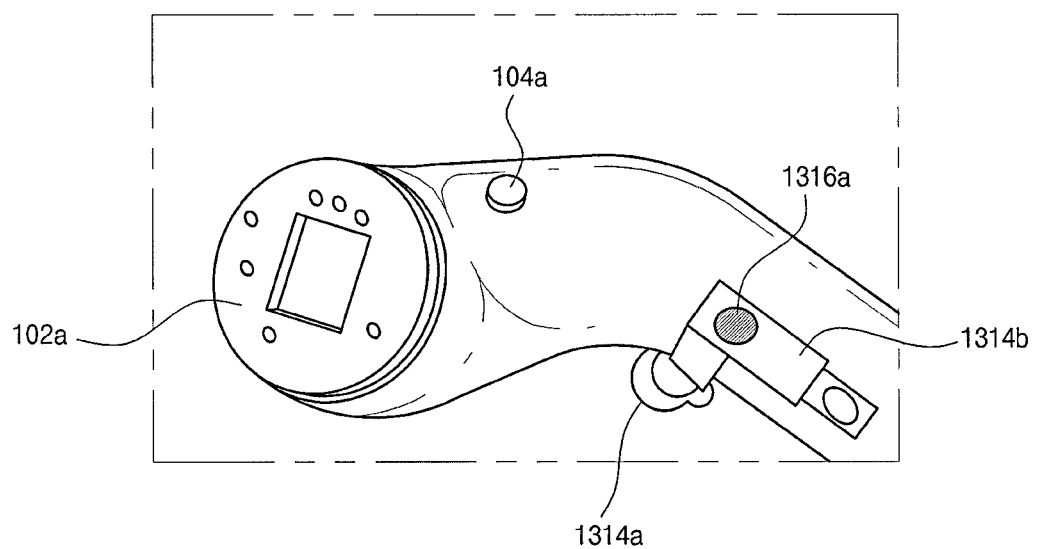
FIG. 16 is a rear view illustrating a plate member which is horizontally moved by a pull member, and a folding lever including a third magnetic substance.

FIG. 16 is a rear view illustrating a plate member which is horizontally moved by a pull member, and a folding lever including a third magnetic substance. FIG. 17 is a cross-sectional view illustrating a state in which current rotation of the folding lever is possible by pulling the pull member in a state in which the current rotation of the folding lever is limited by the plate member of FIG. 16.

Referring to FIGS. 13 to 17, a safety apparatus of an electric bicycle 1300 according to a second embodiment of the present invention includes a foldable portion 102, a first sensing portion 104, a second sensing portion 106, a control unit 1308, and a safety drive portion 110, similarly to the safety apparatus of an electric bicycle 100 according to the first embodiment.

Since functions of respective components and organic connection relations therebetween applied to safety apparatus of an electric bicycle 1300 according to the second embodiment of the present invention are the same as those of the respective components applied to the safety apparatus of an electric bicycle 100 according to the first embodiment, no detailed description will be given thereof.

Here, the safety apparatus of an electric bicycle 1300 according to the second embodiment of the present invention further includes a rotation limit portion 1314 and a third sensing portion 1316.

That is, the rotation limit portion 1314 limits current rotation of a folding lever 102a.

The third sensing portion 1316 senses a state in which the current rotation of the folding lever 102a is limited by the rotation limit portion 1314.

In this case, the control unit 108 is further provided with limited state information of the current rotation sensed by the third sensing portion 1316, and further includes limited state sensing range information on a per rotation basis which is preset.

In addition, when the control unit 1308 determines that the limited state information of the current rotation is deviated from the limited state sensing range information on a per rotation basis, the safety drive portion 110 turns off activation of a motor 10 depending upon the control of the control unit 1308.

In this case, although not shown, the control unit 1308 and the safety drive portion 110 may control overall operation of the electric bicycle using a main computer applied to the electric bicycle, control overall operation of the electric bicycle by a typical ECU (Electric Control Unit) (not shown) or a processor, a memory, and an input/output device provided within a single chip for driving thereof, and include an MCU (Micro Control Unit) (not shown) for driving thereof, but the present invention is not limited thereto. For example, all control means and driving means are applicable as long as the overall operation of the electric bicycle may be controlled and the electric bicycle may be driven.

Here, the control unit 1308 and the safety drive portion 110 may be provided as an ECU (not shown) or an MCU (not shown) in an integral type, or may be provided as an ECU (not shown) or an MCU (not shown) in a separate type.

As an example, as shown in FIGS. 15 to 17, the rotation limit portion 1314 may include a pull member 1314a and a plate member 1314b.

As shown in FIGS. 15 to 17, the pull member 1314a may be provided at the other side of the foldable portion 102 and be connected to the plate member 1314b provided at the other side of the folding lever 102a.

In this case, as shown in FIGS. 16 and 17 (a), the plate member 1314b of the rotation limit portion 1314 may be provided in a state of being mounted in a frame hole h1 of a second frame 102f to protect the inner portion of the foldable portion 102.

On the other hand, as shown in FIGS. 16 and 17 (b), in the rotation limit portion 1314, when a rider pulls the pull member 1314b in a downward direction in a state in which current rotation of the folding lever 102a is limited by the plate member 1314b, the plate member 1314b is elastically operated by pulling the pull member 1314a, thereby being maintained in a state of being spaced apart from the frame hole h1 of the second frame 102f while moving rearward. As a result, the current rotation of the folding lever is possible.

The third sensing portion 1316 may include a third magnetic substance 1316a and a rotation limit sensor 1316b. The control unit 1308 may further include a third control signal for generation of a magnetic field.

Here, the third magnetic substance 1316a may be provided at one side of the plate member 1314b and receive the third control signal from the control unit 1308 to generate a magnetic field. The rotation limit sensor 1316b may be provided at one side of a sensing cover 102g mounted to one side of the second frame 102f and correspond to the third magnetic substance 1316a to sense a current magnetic field formation region generated by the third magnetic substance 1316a according to a limited state of the current rotation of the folding lever 102a.

In this case, when the control unit 1308 determines that the current magnetic field formation region generated by the third magnetic substance 1316a according to the limited state of the current rotation of the folding lever 102a is deviated from a sensing range of a reference magnetic field formation region generated by the third magnetic substance 1316a according to the limited state sensing range information on a per rotation basis of the folding lever 102a, the safety drive portion 110 may turn off activation of the motor 10 depending upon the control of the control unit 1308.

That is, when the control unit 1308 determines that, in the limited state of the current rotation of the folding lever 102a, a spaced distance between the third magnetic substance 1316a and the rotation limit sensor 1316b may not be sensed, the foldable portion is determined as a folded state and the safety drive portion 110 may turn off activation of the motor 10 depending upon the control of the control unit 1308.

In addition, the safety apparatus of an electric bicycle 1300 according to the second embodiment of the present invention further include a first identification portion 1318.

That is, the first identification portion 1318 identifies that current activation of the motor 10 is turned off when the safety drive portion 110 turns off activation of the motor depending upon the control of the control unit 1308.

In this case, although not shown, the first identification portion 1318 includes at least one of an alarm (not shown), a speaker (not shown), and a light emitting member (not shown) which are provided at one side of the electric bicycle such that a rider identifies the information or state of the electric bicycle, and includes at least one of an HMI (Human Machine Interface) module (not shown) and an HUD (Head-UP Display) module (not shown) which are mounted such that a rider grasps the information or state of the electric bicycle by interfacing with machines. Accordingly, the first identification portion 1318 may identify that the current activation of the motor 10 is turned off through at least one of alarm operation of the alarm (not shown), voice operation of the speaker (not shown), light emitting operation of the light emitting member (not shown), HMI message display operation of the HMI module (not shown), and HUD message display operation of the HUD (not shown).

In addition, the safety apparatus of an electric bicycle 1300 according to the second embodiment of the present invention further include a first motor reactivation portion 1320.

That is, the first motor reactivation portion 1320 is electrically connected to the motor 10 and provides a reactivation signal to the motor 10 depending upon the control of the control unit 1308 so as to reactivate the motor 10.

In this case, although not shown, the first motor reactivation portion 1320 may reactivate the motor 10 by button operation of a motor reactivation button (not shown).

Hereinafter, a description will be given of a safety driving method of an electric bicycle to safely drive the electric bicycle using the safety apparatus of an electric bicycle according to the second embodiment of the present invention with reference to FIGS. 18 to 20.

Figure 18:
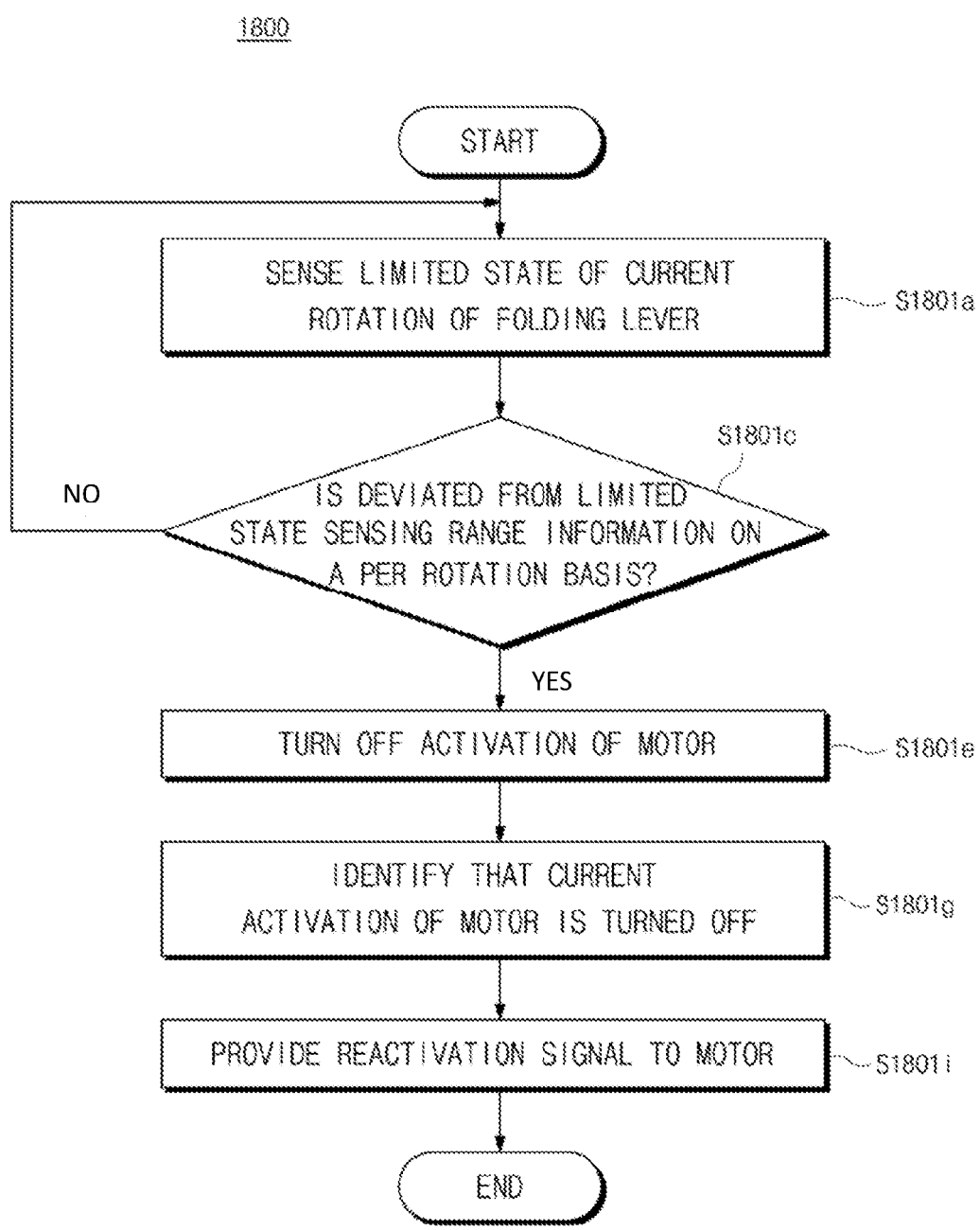
FIG. 18 is a flowchart illustrating a safety driving method of an electric bicycle using the safety apparatus of an electric bicycle according to the second embodiment of the present invention.

FIG. 18 is a flowchart illustrating the safety driving method of an electric bicycle using the safety apparatus of an electric bicycle according to the second embodiment of the present invention.

Figure 19:
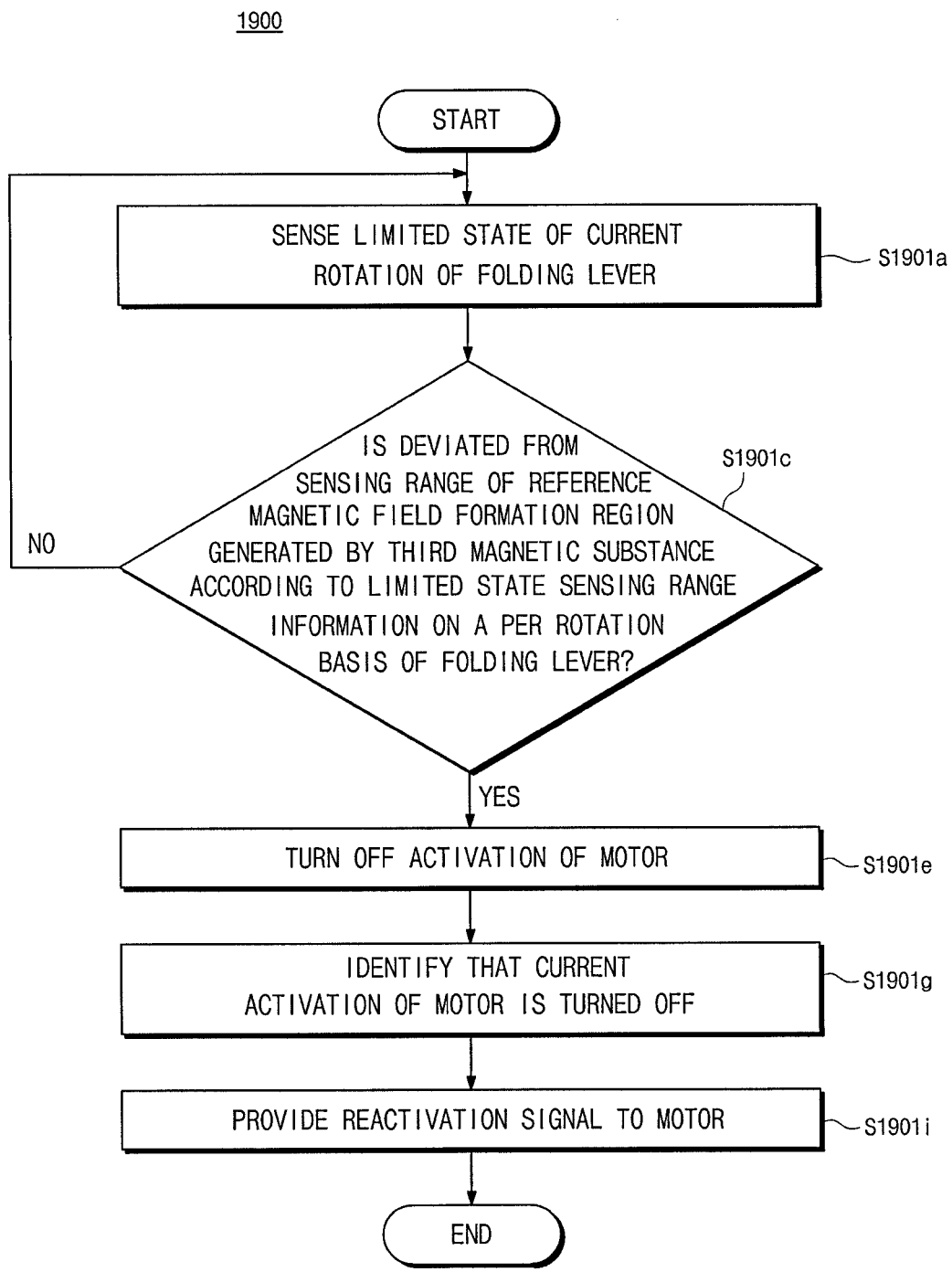
FIG. 19 is a flowchart illustrating an example of the safety driving method of an electric bicycle using the safety apparatus of an electric bicycle according to the second embodiment of the present invention.

FIG. 19 is a flowchart illustrating an example of the safety driving method of an electric bicycle using the safety apparatus of an electric bicycle according to the second embodiment of the present invention. FIG. 20 is a flowchart illustrating another example of the safety driving method of an electric bicycle using the safety apparatus of an electric bicycle according to the second embodiment of the present invention.

Figure 20:
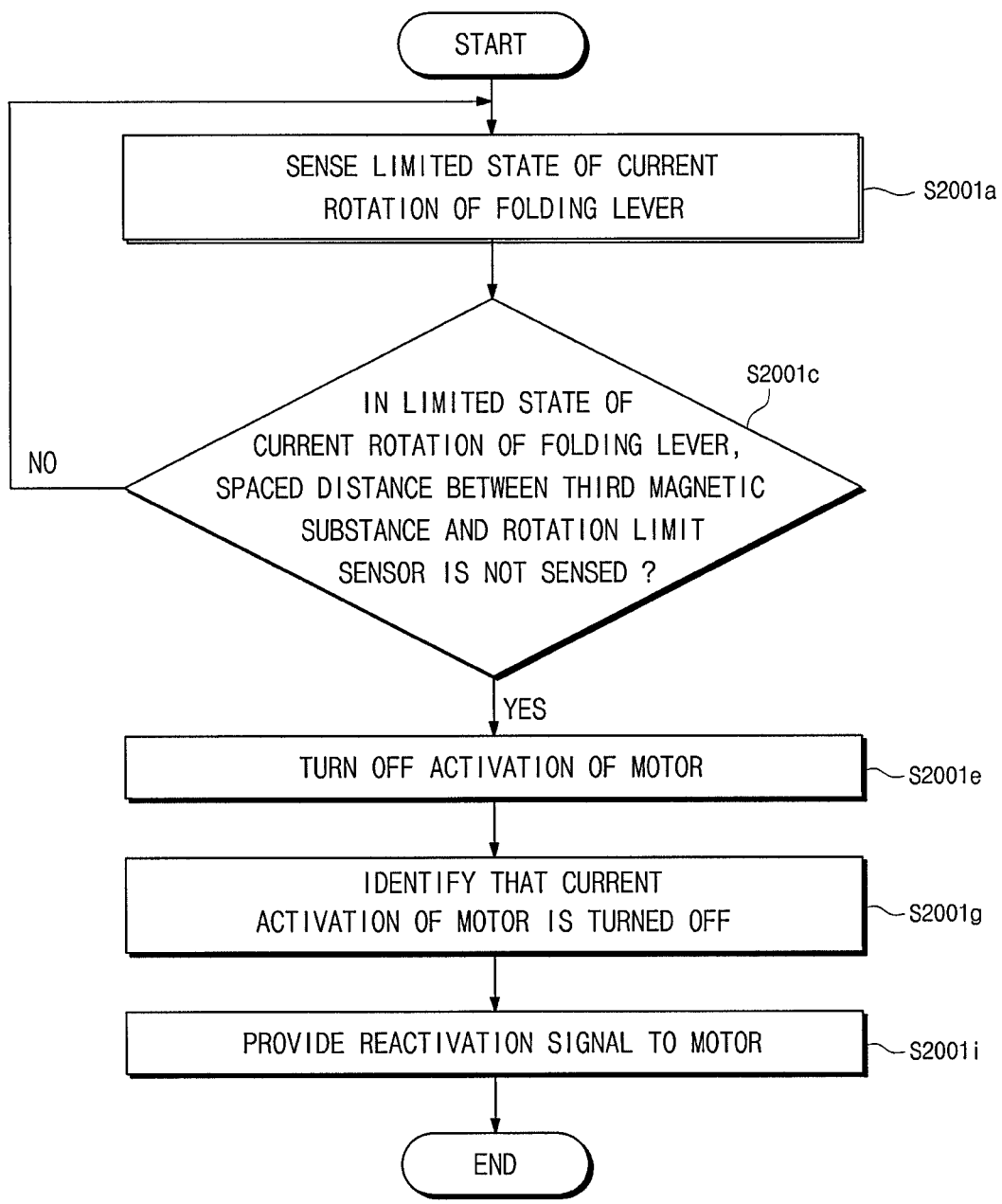
FIG. 20 is a flowchart illustrating another example of the safety driving method of an electric bicycle using the safety apparatus of an electric bicycle according to the second embodiment of the present invention.

Referring to FIGS. 18 to 20, a safety driving method of an electric bicycle 1800, 1900, 2000 using the safety apparatus of an electric bicycle 1300 (see FIGS. 13 and 14) according to the second embodiment of the present invention performs, prior to the second sensing operation S802, S902, S1002, S1102, S1202 (see FIGS. 8 to 12), a first sensing operation S1801a, S1901a, S2001a, a first determination operation S1801c, S1901c, S2001c, and a first safety drive operation S1801e, S1901e, S2001e.

That is, the first sensing operation S1801a allows the third sensing portion 1316 (see FIG. 13) to sense a state in which the current rotation of the folding lever 102a (see FIG. 13) is limited by the rotation limit portion 1314 (see FIG. 13).

Subsequently, the first determination operation S1801c determines whether or not, in the control unit 1308 (see FIG. 13), the limited state information of the current rotation is deviated from the limited state sensing range information on a per rotation basis which is set in the control unit 1308 (see FIG. 13).

Finally, when the control unit 1308 (see FIG. 13) determines that the limited state information of the current rotation is deviated from the limited state sensing range information on a per rotation basis, the first safety drive operation S1801e allows the safety drive portion 110 (see FIG. 13) to turn off activation of the motor 10 (see FIG. 13) depending upon the control of the control unit 1308 (see FIG. 13).

As an example, as shown in FIG. 19, when the control unit 1308 (see FIG. 13) determines that the current magnetic field formation region generated by the third magnetic substance 1316a (see FIGS. 16 and 17) according to the limited state of the current rotation of the folding lever 102a (see FIGS. 15 and 16) is deviated from the sensing range of the reference magnetic field formation region generated by the third magnetic substance 1316a (see FIGS. 16 and 17) according to the limited state sensing range information on a per rotation basis of the folding lever 102a (see FIGS. 15 and 16) (operation S1901c), the first safety drive operation S1901e allows the safety drive portion 110 (see FIG. 13) to turn off activation of the motor 10 (see FIG. 13) depending upon the control of the control unit 1308 (see FIG. 13).

That is, as shown in FIG. 20, when the control unit 1308 (see FIG. 13) determines that, in the limited state of the current rotation of the folding lever 102a (see FIGS. 15 and 16), the spaced distance between the third magnetic substance 1316a (see FIGS. 16 and 17) and the rotation limit sensor 1316b (see FIG. 17) may not be sensed (operation S2001c), the foldable portion is determined as a folded state and the first safety drive operation S2001e may allow the safety drive portion 110 (see FIG. 13) to turn off activation of the motor 10 (see FIG. 13) depending upon the control of the control unit 1308 (see FIG. 13).

In addition, the safety driving method of an electric bicycle 1800, 1900, 2000 using the safety apparatus of an electric bicycle 1300 (see FIGS. 13 and 14) according to the second embodiment of the present invention may further perform a first identification operation S1801g, S1901g, S2001g after the first safety drive operation S1801e, S1901e, S2001e.

That is, the first identification operation S1801g, S1901g, S2001g may allow the first identification portion 1318 (see FIGS. 13 and 14) to identify that current activation of the motor 10 (see FIGS. 13 and 14) is turned off when the safety drive portion 110 (see FIG. 13) turns off activation of the motor 10 (see FIGS. 13 and 14) depending upon the control of the control unit 1308 (see FIGS. 13 and 14).

In addition, the safety driving method of an electric bicycle 1800, 1900, 2000 using the safety apparatus of an electric bicycle 1300 (see FIGS. 13 and 14) according to the second embodiment of the present invention may further perform a first motor reactivation operation S1801i, S1901i, S2001i after the first safety drive operation S1801e, S1901e, S2001e.

That is, the first motor reactivation operation S18011, S19011, S20011 may allow the first motor reactivation portion 1320 (see FIGS. 13 and 14) to be electrically connected to the motor 10 (see FIGS. 13 and 14) and to provide a reactivation signal to the motor 10 (see FIGS. 13 and 14) depending upon the control of the control unit 1308 (see FIGS. 13 and 14) so as to reactivate the motor 10 (see FIGS. 13 and 14).

As described above, the safety apparatus of an electric bicycle 1300 according to the second embodiment of the present invention includes the foldable portion 102, the first sensing portion 104, the second sensing portion 106, the control unit 1308, the safety drive portion 110, the rotation limit portion 1314, the third sensing portion 1316, the first identification portion 1318, and the first motor reactivation portion 1320, and the safety driving method 1800, 1900, 2000 thereof performs the first sensing operation S1801a, S1901a, S2001a, the first determination operation S1801c, S1901c, S2001c, the first safety drive operation S1801e, S1901e, S2001e, the first identification operation S1801g, S1901g, S2001g, the first motor reactivation operation S1801i, S1901i, S2001i, the second sensing operation S802, S902, S1002, S1102, S1202 (see FIGS. 8 to 12), the second determination operation S804, S904, S1004, S1104, S1204 (see FIGS. 8 to 12), and the second safety drive operation S806, S906, S1006, S1106, S1206 (see FIGS. 8 to 12).

Accordingly, in accordance with the safety apparatus of an electric bicycle 1300 and the safety driving method 1800, 1900, 2000 thereof according to the second embodiment of the present invention, since the activation of the motor 10 may be turned off by determining a folded state of foldable portion 102, it may be possible to suppress unnecessary consumption of a battery while preventing imperfect running and safety accidents.

In addition, in accordance with the safety apparatus of an electric bicycle 1300 and the safety driving method 1800, 1900, 2000 thereof according to the second embodiment of the present invention, since activation of the motor 10 may be turned off by previously determining a state in which the current rotation of the folding lever 102a is possible, it may be possible to suppress unnecessary consumption of a battery while preventing imperfect running and safety accidents.

In addition, in accordance with the safety apparatus of an electric bicycle 1300 and the safety driving method 1800, 1900, 2000 thereof according to the second embodiment of the present invention, since it may be identified that activation of the motor 10 is currently turned off when the activation of the motor 10 is turned off, a rider recognizes that the activation of the motor 10 is currently turned off, thereby enabling safety accidents to be further prevented during manipulation of the electric bicycle.

Furthermore, in accordance with the safety apparatus of an electric bicycle 1300 and the safety driving method 1800, 1900, 2000 thereof according to the second embodiment of the present invention, since a rider may reactivate the motor 10, it may be possible to further prevent safety accidents during manipulation of the electric bicycle.

As is apparent from the above description, in accordance with a safety apparatus of an electric bicycle and a safety driving method thereof, the present invention may have the following effects.

Firstly, it may be possible to suppress unnecessary consumption of a battery while preventing imperfect running and safety accidents since activation of a motor may be turned off by determining a folded state of a foldable portion.

Secondly, since it may be identified that activation of a motor is currently turned off when the activation of the motor is turned off, a rider recognizes that the activation of the motor is currently turned off, thereby enabling safety accidents to be further prevented during manipulation of an electric bicycle.

Thirdly, it may be possible to suppress unnecessary consumption of a battery while preventing imperfect running and safety accidents since activation of a motor may be turned off by previously determining a state in which current rotation of a folding lever is possible.

Fourthly, it may be possible to further prevent safety accidents during manipulation of an electric bicycle since a rider may reactivate a motor.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A safety apparatus of an electric bicycle, comprising:
   a folding lever configured to be rotatable for folding a foldable portion;
   a first sensing portion to sense current rotation degree of the folding lever;
   a second sensing portion to sense a current folded position of the foldable portion;
   a control unit provided with at least one of current rotation information of the folding lever sensed by the first sensing portion and current folded position information of the foldable portion, and comprising at least one of sensing range information on a per rotation basis of the folding lever and sensing range information on a per position basis of the foldable portion which are preset; and
   a safety drive portion which, when the control unit determines that at least one of the current rotation information of the folding lever and the current folded position information of the foldable portion is deviated from at least one of the sensing range information on a per rotation basis and the sensing range information on a per position basis, turns off activation of a motor depending upon control of the control unit.

2. The safety apparatus according to claim 1, wherein:
   the first sensing portion comprises:
   a first magnetic substance generating a magnetic field; and
   a folding lever rotation sensor which senses a current magnetic field formation region generated by the first magnetic substance according to the current rotation degree of the folding lever.

3. The safety apparatus according to claim 1, wherein:
   the control unit further comprises a second control signal for generation of a magnetic field; and
   the second sensing portion comprises:
   a second magnetic substance which receives the second control signal to generate a magnetic field; and
   a folded position sensor which senses a current magnetic field formation region generated by the second magnetic substance according to the current folded position of the foldable portion.

4. The safety apparatus according to claim 1, further comprising a second identification portion identifying that current activation of the motor is turned off when the safety drive portion turns off activation of the motor depending upon the control of the control unit.

5. The safety apparatus according to claim 1, further comprising:
   a rotation limit portion to limit the current rotation degree of the folding lever; and
   a third sensing portion which senses a limited state of the current rotation degree of the folding lever by the rotation limit portion,
   wherein the control unit is further provided with limited state information of the current rotation degree sensed by the third sensing portion, and further comprises limited state sensing range information on a per rotation basis which is preset, and wherein when the control unit determines that the limited state information of the current rotation degree is deviated from the limited state sensing range information on a per rotation basis, the safety drive portion turns off the activation of the motor depending upon the control of the control unit.

6. The safety apparatus according to claim 5, wherein:
the control unit further comprises a third control signal for generation of a magnetic field; and
the third sensing portion comprises:
a third magnetic substance which receives the third control signal to generate a magnetic field; and
a rotation limit sensor which senses a current magnetic field formation region generated by the third magnetic substance according to the limited state of the current rotation degree.

7. The safety apparatus according to claim 5, further comprising a first identification portion identifying that current activation of the motor is turned off when the safety drive portion turns off activation of the motor depending upon the control of the control unit.

8. The safety apparatus according to claim 1, further comprising a second motor reactivation portion which is electrically connected to the motor and provides a reactivation signal to the motor depending upon the control of the control unit so as to reactivate the motor.

9. The safety apparatus according to claim 5, further comprising a first motor reactivation portion which is electrically connected to the motor and provides a reactivation signal to the motor depending upon the control of the control unit so as to reactivate the motor.

10. A method of safely driving an electric bicycle, comprising:
performing a second sensing operation which executes at least one of operation to sense current rotation degree of a folding lever by a first sensing portion and operation to sense a current folded position of a foldable portion by a second sensing portion;
performing a second determination operation which determines whether or not, in a control unit, at least one of current rotation information of the folding lever and current folded position information of the foldable portion is deviated from at least one of sensing range information on a per rotation basis of the folding lever and sensing range information on a per position basis of the foldable portion set in the control unit; and
performing a second safety drive operation which, when the control unit determines that at least one of the current rotation information of the folding lever and the current folded position information of the foldable portion is deviated from at least one of the sensing range information on a per rotation basis and the sensing range information on a per position basis, allows a safety drive portion to turn off activation of a motor depending upon the control of the control unit.

11. The method according to claim 10, further comprising performing, after the second safety drive operation, a second identification operation which allows a second identification portion to identify that current activation of the motor is turned off when the safety drive portion turns off the activation of the motor depending upon the control of the control unit.

12. The method according to claim 10, further comprising:
performing, prior to the second sensing operation, a first sensing operation which allows a third sensing portion to sense a limited state of the current rotation degree of the folding lever by a rotation limit portion;
performing, after the first sensing operation, a first determination operation which determines whether or not, in the control unit, limited state information of the current rotation degree is deviated from limited state sensing range information on a per rotation basis set in the control unit; and
performing, after first determination operation, a first safety drive operation which, when the control unit determines that the limited state information of the current rotation degree is deviated from the limited state sensing range information on a per rotation basis, allows the safety drive portion to turn off the activation of the motor depending upon the control of the control unit.

13. The method according to claim 12, further comprising performing, after the first safety drive operation, a first identification operation which allows a first identification portion to identify that current activation of the motor is turned off when the safety drive portion turns off the activation of the motor depending upon the control of the control unit.

14. The method according to claim 10, further comprising performing, after the second safety drive operation, a second motor reactivation operation which allows a second motor reactivation portion to be electrically connected to the motor and to provide a reactivation signal to the motor depending upon the control of the control unit so as to reactivate the motor.

15. The method according to claim 12, further comprising performing, after the first safety drive operation, a first motor reactivation operation which allows a first motor reactivation portion to be electrically connected to the motor and to provide a reactivation signal to the motor depending upon the control of the control unit so as to reactivate the motor.

16. The method according to claim 10, wherein the performing the second sensing operation comprises sensing a current magnetic field formation region generated by a first magnetic substance according to the current rotation degree of the folding lever.

17. The method according to claim 10, wherein the performing the second sensing operation comprises sensing a current magnetic field formation region generated by a second magnetic substance according to the current folded position of the foldable portion.

18. The method according to claim 12, wherein the performing the first sensing operation comprises sensing a current magnetic field formation region generated by a third magnetic substance according to the limited state of the current rotation.

19. The safety apparatus of claim 2, wherein the first magnetic substance is provided at one side of the folding lever.

20. The safety apparatus of claim 1, wherein the first magnetic substance is provided at the foldable portion.

* * * * *